United States Patent
Goodrich et al.

(10) Patent No.: US 11,101,608 B2
(45) Date of Patent: Aug. 24, 2021

(54) CONDUCTOR ASSEMBLIES HAVING FILTER CORES

(71) Applicant: Hamilton Sundstrand Corporation, Charlotte, NC (US)

(72) Inventors: Timothy Arn Goodrich, Rockford, IL (US); Eric W. Karlen, Rockford, IL (US); Mark W. Metzler, Davis, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 206 days.

(21) Appl. No.: 16/177,175

(22) Filed: Oct. 31, 2018

(65) Prior Publication Data

US 2020/0136323 A1    Apr. 30, 2020

(51) Int. Cl.
*H01R 13/7193* (2011.01)
*H01R 13/646* (2011.01)

(52) U.S. Cl.
CPC ....... *H01R 13/7193* (2013.01); *H01R 13/646* (2013.01)

(58) Field of Classification Search
CPC .......... B22F 3/1055; B22F 7/004; B22F 7/08; B22F 2999/00; B22F 10/20; B23K 10/027; B33Y 10/00; B33Y 80/00; C23C 4/06; C23C 4/134; H01F 17/06; H01F 41/02; H01F 2017/065; H01F 41/16; H01B 7/0861; H01B 13/28; H01R 13/646; H01R 13/7193
USPC ......... 174/68.1, 72 B, 70 B, 99 B, 541, 528, 174/71 B, 88 B, 70 R; 361/611, 600, 601, 361/648, 637
See application file for complete search history.

(56) References Cited

U.S. PATENT DOCUMENTS

| | | | | |
|---|---|---|---|---|
| 4,436,953 A | * | 3/1984 | Gottlieb | H02G 5/005 |
| | | | | 174/72 B |
| 4,565,591 A | | 1/1986 | Shannon | |
| 4,857,676 A | | 8/1989 | Garner et al. | |
| 5,162,772 A | * | 11/1992 | May | H01F 17/06 |
| | | | | 174/92 |
| 5,990,417 A | | 11/1999 | Senda et al. | |
| 6,822,845 B2 | * | 11/2004 | Chereson | H01F 17/06 |
| | | | | 361/302 |
| 2003/0062965 A1 | | 4/2003 | Jensen | |

(Continued)

FOREIGN PATENT DOCUMENTS

| DE | 2926485 A1 | 1/1981 |
|---|---|---|
| EP | 3185258 A1 | 6/2017 |
| EP | 3129996 B1 | 7/2017 |

(Continued)

OTHER PUBLICATIONS

Extended European search report issued in corresponding EP application No. 19205993.9, dated May 25, 2020.

*Primary Examiner* — Angel R Estrada
(74) *Attorney, Agent, or Firm* — Locke Lord LLP; Daniel J. Fiorello; Gabrielle Gelozin

(57) ABSTRACT

A conductor assembly can include one or more conductors formed by a conductive material, and one or more filter cores formed integrally on and at least partially around the one or more conductors. The one or more filter cores can be formed of a material different than the conductive material and can be configured to reduce electromagnetic emissions from the one or more conductors.

15 Claims, 4 Drawing Sheets

(56) References Cited

U.S. PATENT DOCUMENTS

2007/0215962 A1    9/2007   Minervini et al.
2009/0315156 A1   12/2009   Harper

FOREIGN PATENT DOCUMENTS

JP     2006353017 A    12/2006
JP     2015049184 A     3/2015

\* cited by examiner

CONDUCTOR ASSEMBLIES HAVING FILTER CORES

BACKGROUND

1. Field

The present disclosure relates to conductor assemblies having filter cores, e.g., for filtering noise.

2. Description of Related Art

HIRF (High Radio Frequency) Filters have been used for years to help in meeting conducted emission requirements (EMC/EMI). They typically employ Filter cores disposed on systems with two or more conductors (wires or bus bars) close to the output of the power converter or inverter. For low power, a ferrite bead with two wires can be used. In power applications, bus bars carry high current and Filter cores are glued onto the bus bar structure. Such systems can have issues with chipping, vibration related damage, and difficult assembly. For example, available materials are of a fixed shape and size, have to be bonded, and can break off with vibration.

Such conventional methods and systems have generally been considered satisfactory for their intended purpose. However, there is still a need in the art for improved conductor assemblies having filter cores. The present disclosure provides a solution for this need.

SUMMARY

A conductor assembly can include one or more conductors formed by a conductive material, and one or more filter cores formed integrally on and at least partially around the one or more conductors. The one or more filter cores can be formed of a material different than the conductive material and can be configured to reduce electromagnetic emissions from the one or more conductors.

The one or more conductors can include a bus bar, for example. Any other suitable conductor (e.g., a wire) is contemplated herein.

In certain embodiments, the one or more filter cores can surround each of the one or more conductors. Any other suitable shape of the filter cores is contemplated herein.

The one or more conductors can include a plurality of conductors. In certain embodiments, the one or more filter cores can include a separate filter core for each conductor. At least one electrical insulator (e.g., a dielectric layer) can be disposed on or in the assembly and configured to electrically insulate each conductor of the plurality of conductors. In certain embodiments, the plurality of conductors and each filter core can be stacked.

In certain embodiments, each filter core can be formed directly on the plurality of conductors such that each filter core is in electrical communication with each conductor. The assembly can include at least one electrical insulator (e.g., a dielectric) disposed between each filter core of each conductor to electrically isolate each filter core and each conductor.

In certain embodiments, the one or more filter cores includes a continuous filter core surrounding the plurality of conductors. An electrical insulator (e.g., a dielectric) can be disposed between each conductor and the filter core to electrically isolate each conductor from the continuous filter core.

In certain embodiments, the one or more conductors can be made of copper. Any other suitable conductive material is contemplated herein.

The one or more filter cores can be additively manufactured on the one or more conductors. For example, the one or more filter cores can be sprayed (e.g., cold sprayed, plasma sprayed) on the one or more conductors. Any other suitable manufacturing method is contemplated herein (e.g., laser sintering using multi material systems).

In accordance with at least one aspect of this disclosure, the one or more filter cores can be non-conductive. A method for forming a conductor assembly can include additively manufacturing one or more filter cores on one or more conductors to form the conductor assembly. Additively manufacturing can include plasma spraying ferrous powder on the one or more conductors, for example.

In certain embodiments, additively manufacturing includes cold spraying ferrous powder on the one or more conductors. The method can include controlling a particle size of the ferrous powder to control an electromagnetic characteristic of the one or more filter cores additively manufactured on the one or more conductors. The method can include disposing a dielectric between each filter core of each conductor.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
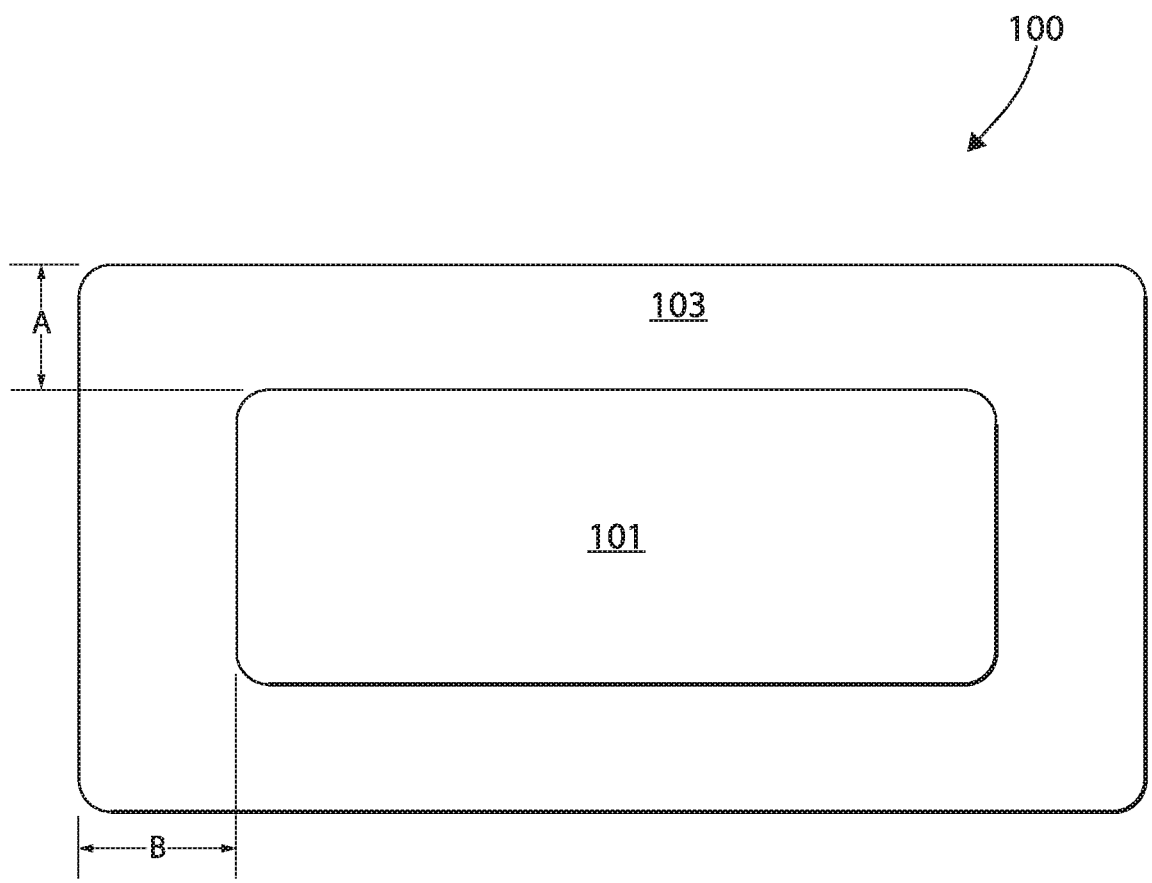
FIG. 1 is a schematic cross-sectional view of an embodiment of an assembly in accordance with this disclosure.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 2-4.

Referring to FIG. 1, a conductor assembly 100 can include one or more conductors 101 formed by a conductive material (e.g., copper). The assembly 100 can include one or more filter cores 103 formed integrally on and at least partially around the one or more conductors 101. The one or more filter cores 103 can be formed of a material (e.g., ferrite, iron, or any other suitable material to function as a filter core) different than the conductive material and can be configured to reduce electromagnetic emissions from the one or more conductors 101.

The one or more conductors 101 can include a bus bar, for example, as shown. Any other suitable conductor (e.g., a wire) is contemplated herein.

Figure 2:
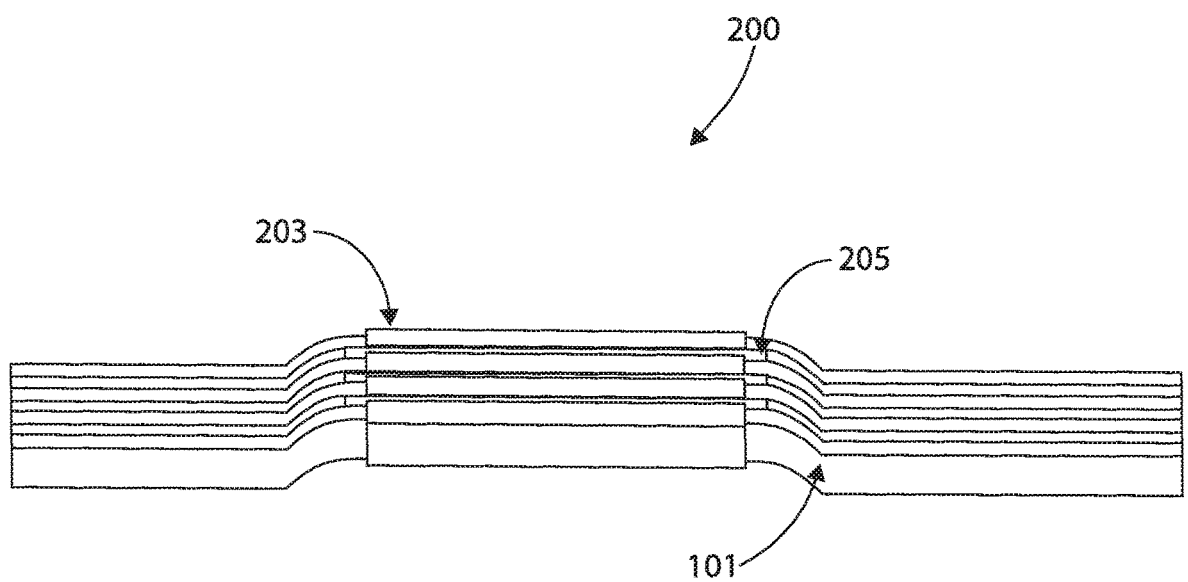
FIG. 2 is a schematic perspective view of an embodiment of an assembly in accordance with this disclosure.
Figure 3:
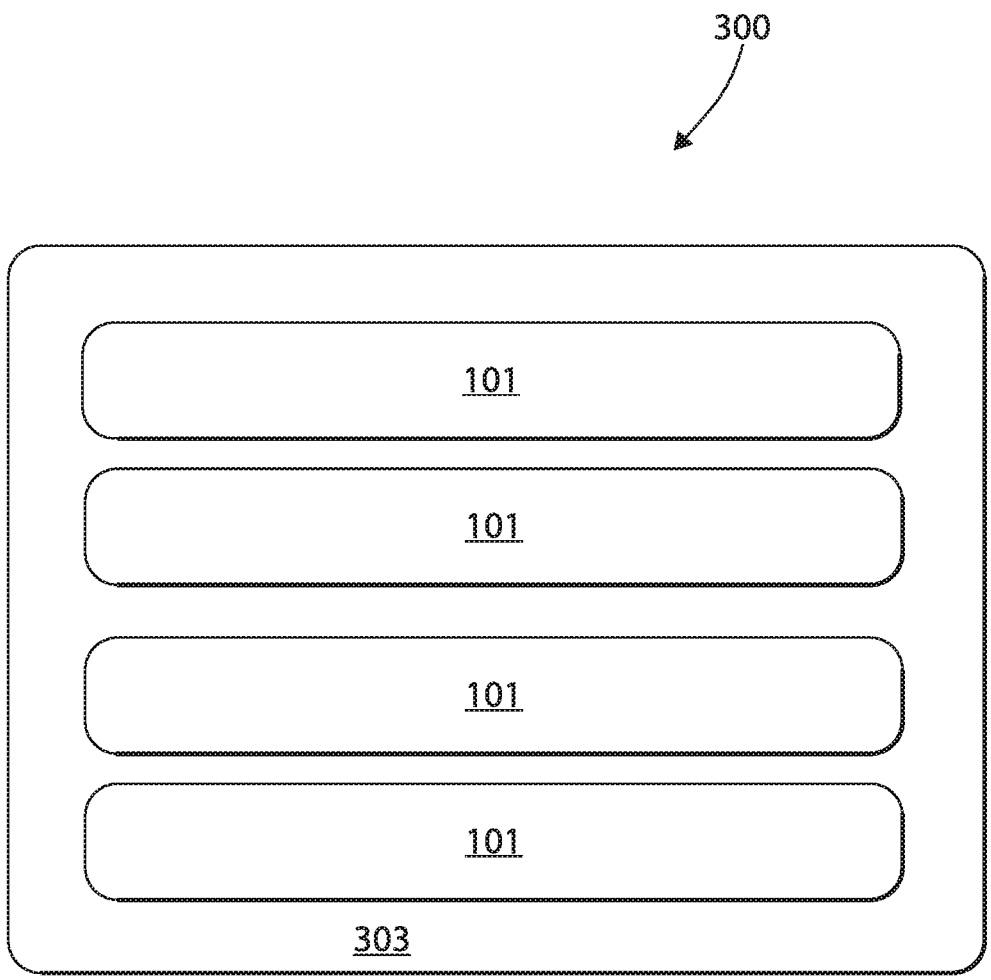
FIG. 3 is a schematic cross-sectional view of an embodiment of an assembly in accordance with this disclosure.
Figure 4:
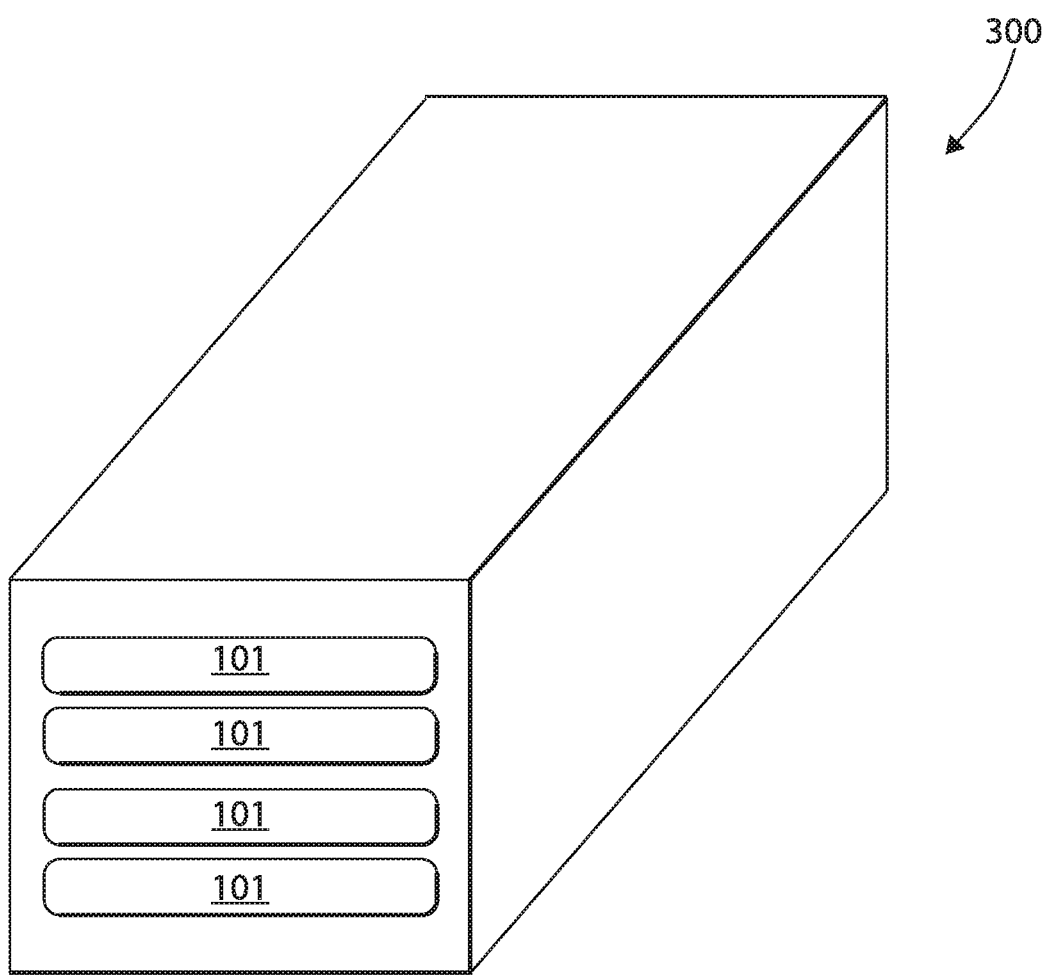
FIG. 4 is a schematic perspective view of the embodiment of FIG. 3.

Referring additionally to assemblies 200, 300 of FIG. 2-4, as shown, the one or more filter cores 103, 203, 303 can surround each of the one or more conductors 101. Any other suitable shape of the filter cores 103, 203, 303 is contemplated herein.

As shown in FIGS. 2-4, the one or more conductors 101 can include a plurality of conductors 101, e.g., four or any other suitable number. In certain embodiments, as shown in FIG. 2, the one or more filter cores 203 can include a separate filter core 203 for each conductor 101. At least one electrical insulator 205 (e.g., a dielectric layer, a non-conductive ceramic layer) can be disposed on or in the assembly 100, 200, 300 and configured to electrically insulate each conductor 101 of the plurality of conductors 101. In certain embodiments, the plurality of conductors 101 and each filter core 203 can be stacked (e.g., with an insulator between each filter core 203 as shown).

In certain embodiments, each filter core 103, 203, 303 can be formed directly on the plurality of conductors 101 such that each filter core 103, 203, 303 is in electrical communication with each conductor 101. The assembly 100, 200, 300 can include at least one electrical insulator (e.g., a dielectric, a non-conductive ceramic layer) disposed between each filter core 103, 203, 303 of each conductor 101 to electrically isolate each filter core 103, 203, 303 and each conductor 101.

Referring to FIGS. 3 and 4, in certain embodiments, the one or more filter cores 103, 203, 303 can include a continuous filter core 303 surrounding the plurality of conductors 101. An electrical insulator (e.g., a dielectric, a non-conductive ceramic layer such as an oxide) can be disposed between each conductor 101 and the filter core 303 (e.g., deposited directly on the conductor 101) to electrically isolate each conductor 101 from the continuous filter core 303.

In certain embodiments, the one or more conductors 101 can be made of copper. Any other suitable conductive material is contemplated herein. In accordance with at least one aspect of this disclosure, the one or more filter cores can be non-conductive. The one or more filter cores 103, 203, 303 can be made of any suitable material, e.g., ferrite (which can be a non-conductive material) or any other suitable material that can filter electromagnetic radiation to function as a filter core as appreciated by those having ordinary skill in the art.

The one or more filter cores 103, 203, 303 can be additively manufactured on the one or more conductors 101. For example, the one or more filter cores 103, 203, 303 can be sprayed (e.g., cold sprayed, plasma sprayed) on the one or more conductors 101. Any other suitable manufacturing method is contemplated herein (e.g., laser sintering using multi material systems such that both the one or more filter cores and conductor are built together).

A method for forming a conductor assembly can include additively manufacturing one or more filter cores on one or more conductors to form the conductor assembly. Additively manufacturing can include plasma spraying ferrous powder on the one or more conductors, for example.

In certain embodiments, additively manufacturing includes cold spraying ferrous powder on the one or more conductors. The method can include controlling a particle size of the ferrous powder to control an electromagnetic characteristic of the one or more filter cores additively manufactured on the one or more conductors. The method can include disposing a dielectric between each filter core of each conductor.

Embodiments deposit powered ferrous material over a coated bus bar. Embodiments can modify particle size to control electrical/electromagnetic characteristics of the filter.

Embodiments can include a thin film (e.g., around 1 micron) deposited on copper. Certain powered (ground) ferrous materials that can be deposited in much thicker layers making them suitable for high current applications.

Embodiments can provide multilayer high current bus structures that are easy to manufacture, have stronger structures than existing technologies, reduce foreign object damage potential, include improved EMI filtering (e.g., due to filter between conductors), allow optimization of size and weight, and provide more flexibility in design than with off-the-shelf cores.

When 3 of more phases (e.g., bus bars) are sandwiched together, the conductors in the center are farther from the ferrite in traditional systems and the have a reduced filtering of the High frequency noise. Embodiments provide enhanced filtering and are stronger and more tolerant to High Vibration.

In certain embodiments, filter cores can be smaller (e.g., thinner) and less fragile in comparison to existing filtering materials. Embodiments can create a structural component rather than a component simply adhered to the bus bar as in traditional technologies. Due to structural integrity of the sintered ferrite material, filtering can be optimized and occur over a longer length of the conductor.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A conductor assembly, comprising:
   one or more conductors formed by a conductive material;
   one or more filter cores formed integrally on and at least partially around the one or more conductors, wherein the one or more filter cores are formed of a material different than the conductive material and are configured to reduce electromagnetic emissions from the one or more conductors, wherein the one or more conductors include a plurality of conductors, wherein the one or more filter cores includes a continuous filter core surrounding the plurality of conductors; and
   an electrical insulator disposed between each conductor and the continuous filter core to electrically isolate each conductor from each filter core, wherein the electrical insulator surrounds an entirety of each of the plurality of conductors.

2. The assembly of claim 1, wherein the one or more conductors include a bus bar.

3. The assembly of claim 1, wherein the one or more filter cores surround each of the one or more conductors.

4. The assembly of claim 1, wherein the one or more filter cores include a separate filter core for each conductor.

5. The assembly of claim 4, further comprising at least one electrical insulator disposed on or in the assembly and configured to electrically insulate each conductor of the plurality of conductors.

6. The assembly of claim 5, wherein the plurality of conductors and each filter core are stacked.

7. The assembly of claim 6, wherein each filter core is formed directly on the plurality of conductors such that each filter core is in electrical communication with each conductor, the assembly further comprising at least one electrical insulator disposed between each filter core of each conductor to electrically isolate each filter core and each conductor.

8. The assembly of claim 1, wherein the one or more conductors are made of copper.

9. The assembly of claim 1, wherein the one or more filter cores are additively manufactured on the one or more conductors.

10. The assembly of claim 9, wherein the one or more filter cores are sprayed on the one or more conductors.

11. The assembly of claim 1, wherein the one or more filter cores are non-conductive.

12. A method for forming a conductor assembly, comprising: additively manufacturing one or more filter cores on one or more conductors to form the conductor assembly; wherein additively manufacturing includes plasma spraying ferrous powder on the one or more conductors.

13. The method of claim 12, wherein additively manufacturing includes cold spraying ferrous powder on the one or more conductors.

14. The method of claim 13, further comprising controlling a particle size of the ferrous powder to control an electromagnetic characteristic of the one or more filter cores additively manufactured on the one or more conductors.

15. The method of claim 12, further comprising disposing a dielectric between each filter core of each conductor.

* * * * *